S. E. GLADDING.
FAUCET ATTACHMENT.
APPLICATION FILED JUNE 13, 1910.
971,602.
Patented Oct. 4, 1910.
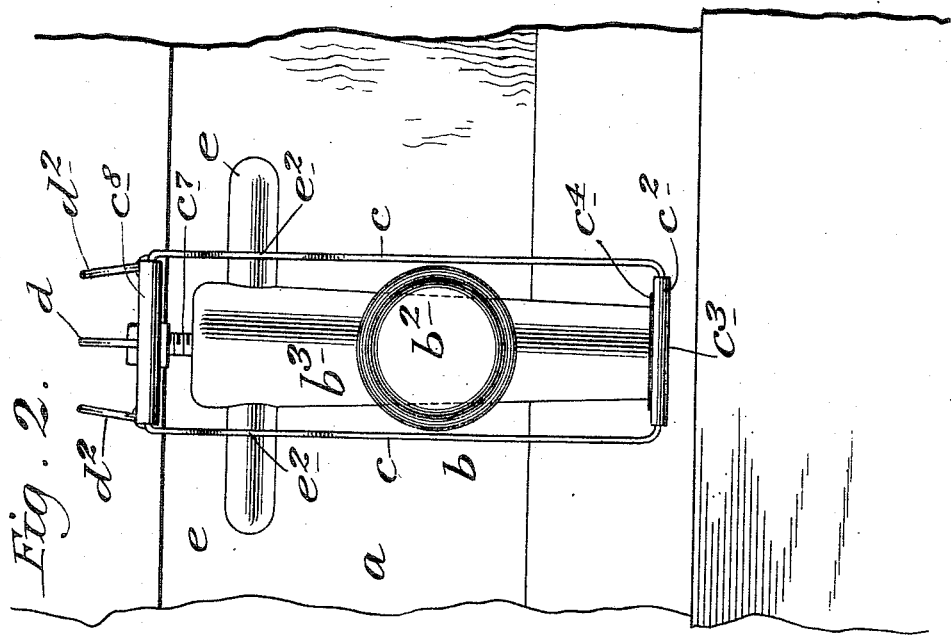
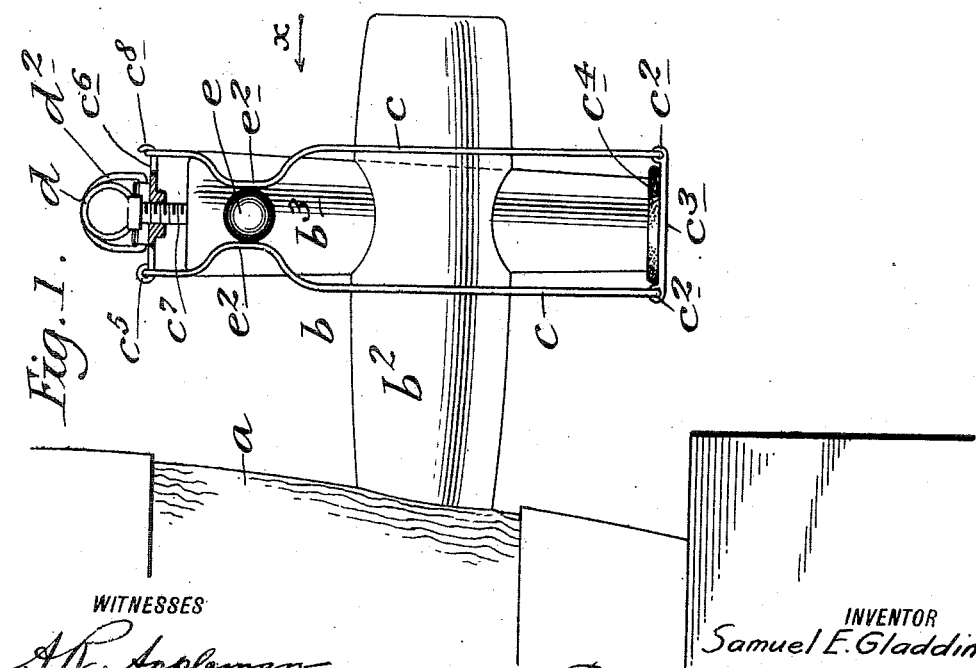
WITNESSES
A. R. Appleman
B. M. Ryerson
INVENTOR
Samuel E. Gladding
BY Edgar Tate & Co.
ATTORNEYS

UNITED STATES PATENT OFFICE.

SAMUEL E. GLADDING, OF JERSEY CITY, NEW JERSEY.

FAUCET ATTACHMENT.

971,602. Specification of Letters Patent. Patented Oct. 4, 1910.

Application filed June 13, 1910. Serial No. 566,530.

*To all whom it may concern:*

Be it known that I, SAMUEL E. GLADDING, a citizen of the United States, and residing at Jersey City, in the county of Hudson and State of New Jersey, have invented certain new and useful Improvements in Faucet Attachments, of which the following is a specification, such as will enable those skilled in the art to which it appertains to make and use the same.

This invention relates to faucets and the object thereof is to provide an attachment for devices of this class which will prevent drip or leakage, and which will also prevent the unauthorized use of the faucet.

The invention is fully disclosed in the following specification, of which the accompanying drawing forms a part, in which the separate parts of my improvement are designated by suitable reference characters in each of the views, and in which:—

Figure 1 is a side view of a faucet provided with my improved attachment and showing the faucet connected with a barrel, part of the construction of the attachment being shown in section, and Fig. 2 a view looking in the direction of the arrow $x$.

In the drawing forming part of this specification I have shown at $a$ a barrel, and at $b$ an ordinary faucet composed of a main plug member $b^2$ and a plug valve $b^3$ which controls the passage through the main plug member $b^2$ and which passes transversely through said main plug member.

My improved faucet attachment consists of two side yoke members $c$, with one end portion of which is connected, as shown at $c^2$, a plate $c^3$, on which is placed a packing $c^4$.

The connections at $c^2$ are pivotal or hinge connections, and the other end portion of one of the side yoke members $c$ is connected in a similar manner at $c^5$ with a plate $c^6$, the central portion of which is thickened and provided with a screw $c^7$ which is passed therethrough and adapted to bear on the upper end of the plug valve $b^3$.

The plate $c^6$ is provided opposite the connection at $c^5$ with a hook $c^8$, with which in practice the other side yoke member $c$ is adapted to be connected, and the screw $c^7$ is provided with a ring $d$ which is connected with the head portion thereof, and the plate $c^6$ or the side edges thereof at right angles to the connections at $c^5$ and $c^8$ are provided with rings $d^2$.

The plug valve $b^3$ is provided in the larger end thereof with a transverse handle member $e$, and the side portions of the yoke-shaped side members $c$ are bent inwardly as shown at $e^2$ and adapted to bear on the said handle member $e$.

In applying this device to the faucet, one of the yoke-shaped side members $c$ is disconnected at $c^8$ from the plate $c^6$, and the smaller end of the main plug member $b^2$ of the faucet is passed through the attachment, the side yoke member $c$ is then connected with the plate $c^6$ and the screw $c^7$ is turned so that it bears firmly on the upper end of the plug valve $b^3$. This securely locks the attachment to the faucet, and the bottom plate $c^3$ of the attachment and the packing $c^4$ securely close the lower end of the plug valve $b^3$ and prevent any drip or leakage, and in order to use the faucet the screw $c^7$ must be loosened, the side yoke member $c$ disconnected from the top plate $c^6$ and swung downwardly and outwardly so that the lower end of the plug valve $b^3$ may be opened.

When the attachment is secured to the faucet as shown in the drawing a pad lock or other lock may be connected with the ring members $d$ and $d^2$ in such manner that the screw $c^7$ cannot be operated and the attachment cannot be detached from the faucet and the use of said faucet will, under these circumstances be impossible.

Having fully described my invention, what I claim as new, and desire to secure by Letters Patent, is:—

1. An attachment for faucets provided with the usual plug valve, said attachment consisting of a bottom plate, a top plate and side yoke members, said side yoke members being hinged to the bottom plate and one of said side yoke members being hinged to the top plate and the other detachably connected therewith, said top plate being provided with a screw which is passed centrally therethrough.

2. An attachment for faucets provided with the usual plug valve, said attachment consisting of a bottom plate, a top plate and side yoke members, said side yoke members being hinged to the bottom plate and one of said side yoke members being hinged to the top plate and the other detachably connected therewith, said top plate being provided with a screw which is passed centrally therethrough, and the head of which is provided with a ring, said top plate being also provided with rings.

In testimony that I claim the foregoing as my invention I have signed my name in presence of the subscribing witnesses this 10th day of June 1910.

SAMUEL E. GLADDING.

Witnesses:
C. E. MULREANY,
B. M. RYERSON.